Dec. 16, 1952 — A. F. JACKSON — 2,621,962
ANTIRATTLE DEVICE FOR AUTOMOBILE WINDOWS
Filed March 8, 1950
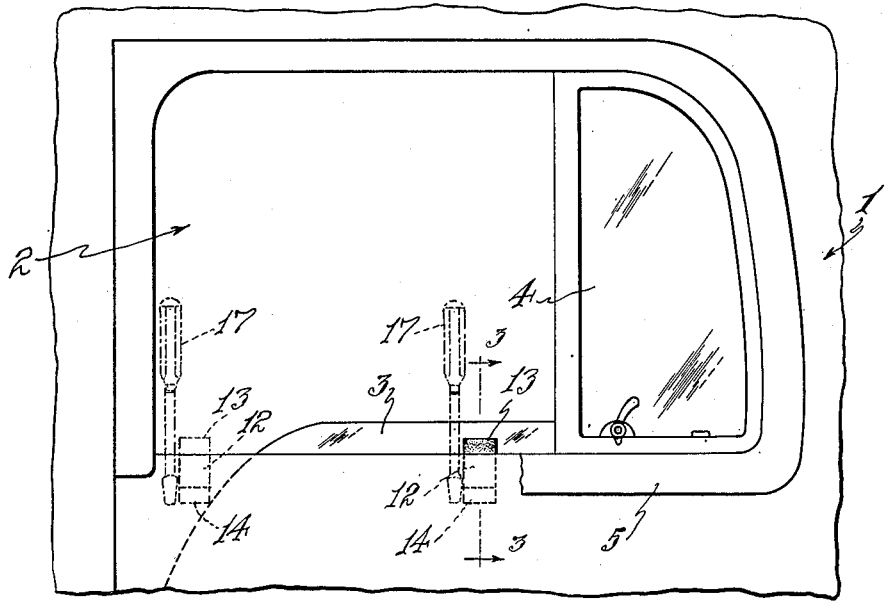
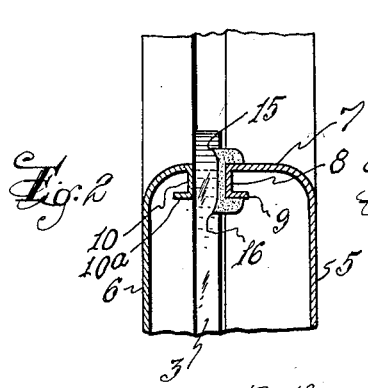
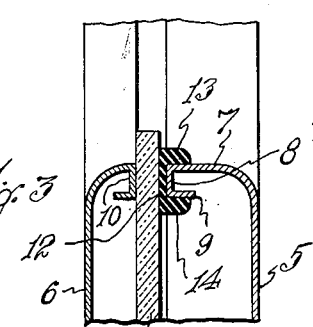
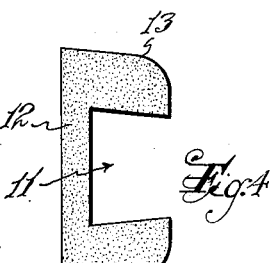
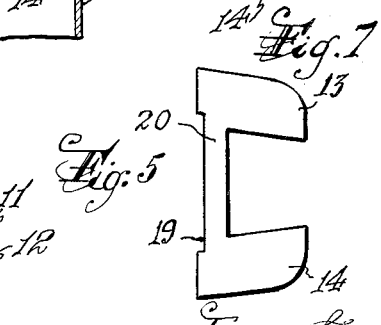
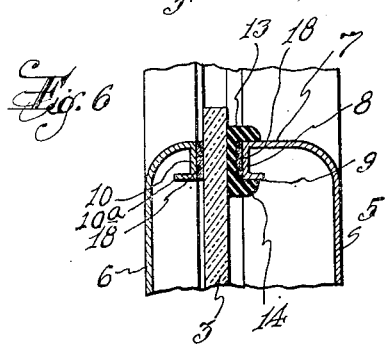
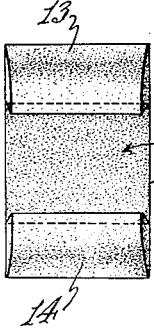
Inventor:
Alexander F. Jackson
BY
Harry R. Rook,
Attorney.

Patented Dec. 16, 1952

2,621,962

UNITED STATES PATENT OFFICE 2,621,962

ANTIRATTLE DEVICE FOR AUTOMOBILE WINDOWS

Alexander F. Jackson, East Orange, N. J.

Application March 8, 1950, Serial No. 148,471

4 Claims. (Cl. 296—44)

This invention relates to devices for preventing rattling of glass plates or panes that are slidable in slots in window frames, for example in the windows of automobiles.

A prime object of the present invention is to provide a device that is adapted to embrace and resiliently frictionally grip a portion of the window frame, particularly the sill of an automobile window, both for mounting the device on the frame and for holding the sliding glass window pane from rattling.

A specific object of the invention is to provide a device of this kind that is formed wholly of resilient material, for example, rubber and adapted to yieldingly press the glass against the window frame at one side of the slot in which the panel is slidable.

Another object of the invention is to provide an anti-rattling device for windows of the type described that is simple, compact and rugged in construction, economical to manufacture and highly efficient in use with a minimum of possibility of snagging clothing and the like.

Other objects and advantages of the invention will be apparent from the description thereof to follow taken in connection with the accompanying drawing in which—

Figure 1 is an elevational view of a fragment of a door of an automobile showing a window assembly embodying my invention, with the sliding window pane shown in almost full open position and with parts shown broken away.

Figure 2 is a vertical sectional view through the bottom frame or sills of the window, with the usual rubbing strips omitted for clarity.

Figure 3 is a similar view taken on the plane of the line 3—3 of Figure 1.

Figure 4 is a side elevational view of the anti-rattling device on an enlarged scale.

Figure 5 is a front elevational view thereof.

Figure 6 is a view similar to Figure 3 but showing fabric rubbing strips on the inner and outer sill faces, which is the normal constructon.

Figure 7 is a view similar to Figure 4 showing an alternate formation of the base portion of the device.

Referring to the drawing, an automobile door 1 is shown provided with the usual window opening 2 for a sliding glass window pane 3 and a swinging glass window pane 4. The opening is surrounded by a window frame assembly of ordinary construction including an inner frame member or sill 5 and an outer frame member or sill 6 spaced therefrom for receiving the sliding window pane 3 therebetween. The inner sill includes an inwardly extending horizontally disposed portion 7, a vertically extending flange portion 8 parallel to the glass pane and an horizontally disposed flange portion 9 extending away from said glass pane. The outer sill has a downwardly extending vertical flange portion 10 in alinement with but spaced from the flange portion 8 of the inner sill and an outwardly extending horizontal portion 10a, thereby providing a channel for receiving the sliding glass pane 3.

The present invention is concerned with a device for preventing the sliding window pane 3 from rattling or accidental movement. This device as shown in Figures 4 and 5 comprises a one-piece block or pad formed of elastic material, preferably rubber or rubber composition, of channel-like cross-section, and rectangular in front and rear elevation and substantially trapezoidal in end elevation. A channel 11 is cut transversely through the block from side to side and opens at the front thus providing a base portion or web 12 and upper and lower flange portions 13 and 14, respectively. The channel is of dovetail formation whereby its width is gradually reduced toward its open front. The outer surface of the base portion is normally flat and the outer corners of the flanges are rounded for utility to prevent snagging of articles thereon and to enhance the appearance of the device. It will be noted that each flange portion is thicker than the base portion and the base portion is of a thickness capable of being squeezed between the sill surface 8 and the glass.

As shown in Figures 1 and 3, the device is normally mounted on the inner sill 5 between said sill and the sliding glass pane 3. To apply the device, the glass pane 3 is lowered to nearly full open position whereby a portion of the window frame assembly to the left of the window opening as viewed in Figure 1 is free of said window pane.

Being held in the hand with the thumb and second finger on the sides of the top flange 13 and with the forefinger on the outer surface of the base portion 12, the block is slipped into the fully open slot beyond the rear edge of the glass pane with the bottom flange 14 extending downwardly; and then with the blade of a screw driver 17 the block is guided and pressed so as to spread the flanges 13 and 14 apart and into embracing relation to the inner sill surfaces 7, 8 and 9 as shown by dot and dash lines in Figure 1. This causes the sloping sides of the dovetail channel to conform to and frictionally grip the upper and lower surfaces 7 and 9 of the sill which are parallel to each other and perpendicular to the surface 8, and also deflects or bends the portions of the block at the juncture of the flanges 13 and 14 with the base portion so that the normally flat base portion is curved and its end edges are forced farther from the bottom surface of the dovetail channel than when normal, as indicated at 15 and 16 in Figure 2. The device with its slightly curved ends 15 and 16 when thus positioned on the inner sill 5 is then slid along the inner sill toward the glass pane 3 as viewed in Fig. 1. This is preferably and conveniently accomplished by inserting the shank of a tool, such as the screw driver 17, downwardly between the outer and inner sills into a position against one side of the device as shown in Figure 1 and forcing the device along the inner sill until its leading side engages the edge of the glass pane 3. Further pressure by the tool then forces the curved ends 15 and 16 over the adjacent edge of the glass pane and squeezes the base portion 12 and such ends into contact with the surface of the pane whereby due to the elasticity of the material, the curved ends 15 and 16 and the entire surface of the base portion 12 will be flattened into intimate contact with the surface of the glass pane 3 as shown in Figure 3. When in this position, the flattened ends of the base portion 12 being under continuous compression exert outward thrust or pressure against the glass pane, and at the same time the flange portions 13 and 14 of the device exert downward and upward thrust or pressure on the horizontal portion 7 and flange 9, respectively, of the sill 5. The normal thickness of the base portion 12 and of the flanges 13 and 14 are normally such that when the zones of juncture of the base portion and said flanges are deformed as described, the spring-like action of the block will take up varying amounts of play between the glass pane and the frame; and at the same time the block will be securely held on the sill 5. The material of which the device is made, however, is sufficiently yielding to permit the glass pane 3 to be slid up or down for closing or opening the window, respectively.

In a window assembly having a glass run strip or weather strip 18 of fabric or other suitable material fastened to each sill 5 and 6 on the surfaces 8 and 10 respectively in the space between said outer sill 6 and inner sill 5 such as shown in Figure 6, the improved device is mounted so as to embrace said inner sill and said strip thereon, which is the normal construction.

Owing to the construction and shape of the device and the elasticity of the material, a device of a particular size may be used in spaces of varying widths between the inner sill and the sliding glass pane 3; and if the play between the frame and the glass is too great to be taken up by one unit or block, another unit can be applied in a similar manner on the outer sill 6. For exceptionally wide windows, two units should be used at spaced points along the sill.

In Figure 7 is shown an alternate formation of the base portion 20 wherein a shallow transverse groove 19 is formed in the base surface so that the tips 15 and 16 of the base are accentuated when the block is applied to a window sill and thereby the hereinbefore described spring-like action for holding the window against rattling is increased.

Changes in details of construction might be made without departing from the principle of the invention.

What I claim is:

1. For use in windows having a glass pane slidable in the slot between two spaced opposed window frame sections one of which has approximately parallel surfaces spaced apart in the plane of the frame, an anti-rattle device comprising a one-piece rectangular block of resilient material having a dove-tail shaped groove extending from side to side in one face thereof providing a thin base portion having its outer surface normally in a flat plane and two relatively thick opposed flanges spaced apart at the bottom of the groove a distance slightly less than the distance between said two surfaces of the frame, said base portion and said flanges being so proportioned that said flanges will be stretched or spread apart each into frictional engagement with one of said surfaces of the frame beyond one edge of said glass pane with the latter in nearly full open position and the portions of said block at the juncture of said flanges and said base portion simultaneously will be deformed away from said groove outwardly beyond said flat planes of said base portion, whereby said block so deformed can be slid along and between said frame section and said glass pane to thereby squeeze said deformed portions back into a flat plane and to force said flanges into strong compression which will push the glass pane toward the other frame section and take up excess play between said glass pane and the window frame.

2. The combination with a window glass movable between two spaced and opposed sill members of a window frame each of which has a vertical surface parallel to and at one side of said glass pane and one of which has two horizontal surfaces substantially perpendicular to said vertical surface and extending away from said glass pane, of a resilient block disposed between said glass pane and said one sill member, said block comprising a base portion and spaced flanges with a dovetail channel between the flanges, said flanges being spread apart and spanning said vertical surface of said one sill member with the inner surfaces of said flanges frictionally and tightly gripping said horizontal surfaces of said one sill member and the ends of said base portion of the block adjacent said flanges being deformed outwardly from the plane of said vertical surface of said one sill member by said spreading apart of the flanges so as to strongly press said ends of the base portion against said glass pane and at the same time cause the intermediate part of said base portion to be pressed against said vertical surface of said one sill member, whereby to cause the glass pane to be presed firmly against the other sill member at all positions of the glass pane throughout its movement in its own plane between said sill members.

3. An anti-rattle device for windows comprising the combination with a glass pane movable between spaced inner and outer window sills each of which has a vertical surface parallel to and at one side of said glass pane and the inner of which has horizontal surfaces substantially perpendicular to said vertical surface and extending away from said glass pane, of a resilient channel-like member interposed between the inner sill and the glass pane, said resilient channel-like member having a base portion and a relatively thick flange at each end thereof, each of said flanges frictionally gripping one of said horizontal surfaces and said base portion being thereby deformed so as to be compressed between said glass pane and said vertical surface of the inner sill to prevent rattling of said glass pane.

4. An anti-rattle device for windows comprising a block of resilient material substantially rectangular in front and rear elevation, said block having a dove-tail groove in its face and extending through the ends of the block providing a channel-like structure having a thin base portion and relatively thick flanges with the wider part of said groove at the juncture of said flanges with said base portion of such a width that said flanges and said base portion may be stretched and fitted over one of two spaced window frame sections with the base portion abutting an inner surface thereof and the ends of said base portion deformed away from said groove so as to be squeezed between such inner surface and a glass pane located between the window frame sections and parallel to said inner surface and thereby take up extra play between the glass pane and window frame sections, and with each of said flanges frictionally gripping one of two surfaces which are perpendicular to the said inner surface.

ALEXANDER F. JACKSON.

REFERENCES CITED

The following references are of record in the file of this patent:

UNITED STATES PATENTS

| Number | Name | Date |
| --- | --- | --- |
| 1,754,115 | Mell | Apr. 8, 1930 |
| 1,908,839 | Greig | May 16, 1933 |
| 2,069,219 | Conlon | Feb. 2, 1937 |
| 2,172,610 | Frank | Sept. 12, 1939 |
| 2,226,615 | Killen | Dec. 31, 1940 |
| 2,236,208 | Creel | Mar. 25, 1941 |